(12) United States Patent
Kuo

(10) Patent No.: US 6,929,300 B1
(45) Date of Patent: Aug. 16, 2005

(54) ADAPTABLE DOOR MIRROR OF AN AUTOMOBILE

(75) Inventor: Fang-Mei Kuo, Tainan (TW)

(73) Assignee: Aloha Auto Industry Co., Yungkang (TW)

( * ) Notice: Subject to any disclaimer, the term of this patent is extended or adjusted under 35 U.S.C. 154(b) by 0 days.

(21) Appl. No.: 10/867,921

(22) Filed: Jun. 15, 2004

(51) Int. Cl.$^7$ .......................... B60R 1/06; G02B 7/182
(52) U.S. Cl. .................... 296/1.11; 248/475.1; 359/871
(58) Field of Search ........................... 296/1.11, 146.1, 296/146.5; 49/502; 248/475.1; 359/871

(56) References Cited

U.S. PATENT DOCUMENTS

| | | | | |
|---|---|---|---|---|
| 2,226,482 A | * | 12/1940 | Sarnes | 248/483 |
| 2,533,475 A | * | 12/1950 | Koonter | 248/478 |
| 3,638,899 A | * | 2/1972 | Bonisch et al. | 248/483 |
| 4,125,244 A | * | 11/1978 | Lukey | 248/475.1 |
| 4,253,633 A | * | 3/1981 | Takegawa | 248/475.1 |
| 5,268,795 A | * | 12/1993 | Usami | 359/841 |
| 6,220,716 B1 | * | 4/2001 | Asaka | 359/871 |

* cited by examiner

Primary Examiner—Joseph D. Pape
(74) Attorney, Agent, or Firm—Alan D. Kamrath; Nikolai & Mersereau, P.A.

(57) ABSTRACT

An adaptable door mirror of an automobile includes a frame, an attachment element, and a bracket. The frame includes a lens fitted therein, a well facing a body of the automobile, and a threaded fastener extended from the well. The attachment element is optional and includes a recess facing the well and a transverse channel in communication with the recess. The bracket is mounted on the body of the automobile and includes a threaded hole facing the attachment element and a cavity in communication with the threaded hole. The fastener either extends through the channel and is threaded in the threaded hole or is threaded in the threaded hole and into the cavity to be secured by a nut. The cost of replacing a malfunctioned door mirror can be saved since, for example, only a replacement of the bracket of the door mirror is sufficient if both the frame and the attachment element are still good for use.

12 Claims, 6 Drawing Sheets

ADAPTABLE DOOR MIRROR OF AN AUTOMOBILE

FIELD OF THE INVENTION

The present invention relates to the door mirror of an automobile and more particularly to such a door mirror having an attachment element easily adapted to mount the bracket of a door mirror of an automobile which can be any model produced by the same manufacturer or which can be any one of various automobiles produced by different manufacturers.

BACKGROUND OF THE INVENTION

Conventionally, the door mirror of an automobile is formed integrally. Such is shown in a door mirror 10 of FIG. 8. The door mirror 10 comprises an attachment member 20 proximate the body of the automobile. The attachment member 20 is formed with a pad 30. A plurality of fasteners (e.g., screws or bolt and nut combinations) 50 are threaded through a plate 40 (which is secured to the body of the automobile) and the attachment member 20 for fastening them together. This finishes the assembly of the door mirror 10 on the automobile.

Another integrally formed door mirror 60 is shown in FIG. 9. The door mirror 60 also comprises an attachment member 70 proximate the body of the automobile. The attachment member 70 has an inner side provided with a buffer element 80. A plurality of fasteners (e.g., screws or bolt and nut combinations) are threaded through the attachment member 70 and the body of the automobile for fastening them together.

However, the above two types of door mirrors are not interchangeable. That is, in a case of a door mirror malfunction, a driver has to buy a door mirror of the same type for replacement. However, such buying for an old automobile is difficult. This often frustrates drivers. Sometimes, interchangeability of door mirrors between two models produced by the same manufacturer is also not feasible. Oftentimes, interchangeability of door mirrors between two automobiles produced by different manufacturers is impossible. Hence, a need exists for an adaptable door mirror which is ready to mount in any automobile.

SUMMARY OF THE INVENTION

It is an object of the present invention to provide an adaptable door mirror of an automobile, comprising a frame, an attachment element and a bracket. The frame includes a lens fitted therein, a well facing a body of the automobile, and a threaded fastener extended from the well toward the body of the automobile. The attachment element includes a recess facing the well and a transverse channel in communication with the recess and the outside. The bracket is mounted on the body of the automobile and includes a threaded hole facing the attachment element and a cavity in communication with the threaded hole and the outside. The fastener extends through the channel and is threaded in the threaded hole into the cavity to be secured by a nut. By utilizing the present invention, the cost of replacing a malfunctioned door mirror can be reduced significantly since, for example, only a replacement of the bracket of the malfunctioned door mirror is sufficient if both the frame and the attachment element are still good for use.

It is another object of the present invention to provide an adaptable door mirror of an automobile, comprising a frame and a bracket. The frame includes a lens fitted therein, a well facing a body of the automobile, and a threaded fastener extended from the well toward the body of the automobile. The bracket is mounted on the body of the automobile and includes a threaded hole facing the well and a cavity in communication with the threaded hole and the outside. The fastener is threaded into the threaded hole into the cavity to be secured by a nut.

In one aspect of the present invention, a compression spring is put on a projected portion of the fastener in the cavity and compressed by the nut.

In another aspect of the present invention, the fastener comprises a threaded bolt having a head and which either extends through the channel and is threaded in the threaded hole or is threaded in the threaded hole and into the cavity, and the nut is put on the bolt to fasten the fastener.

The above and other objects, features and advantages of the present invention will become apparent from the following detailed description taken with the accompanying drawings.

DETAILED DESCRIPTION OF THE PREFERRED EMBODIMENTS

Figure 1:
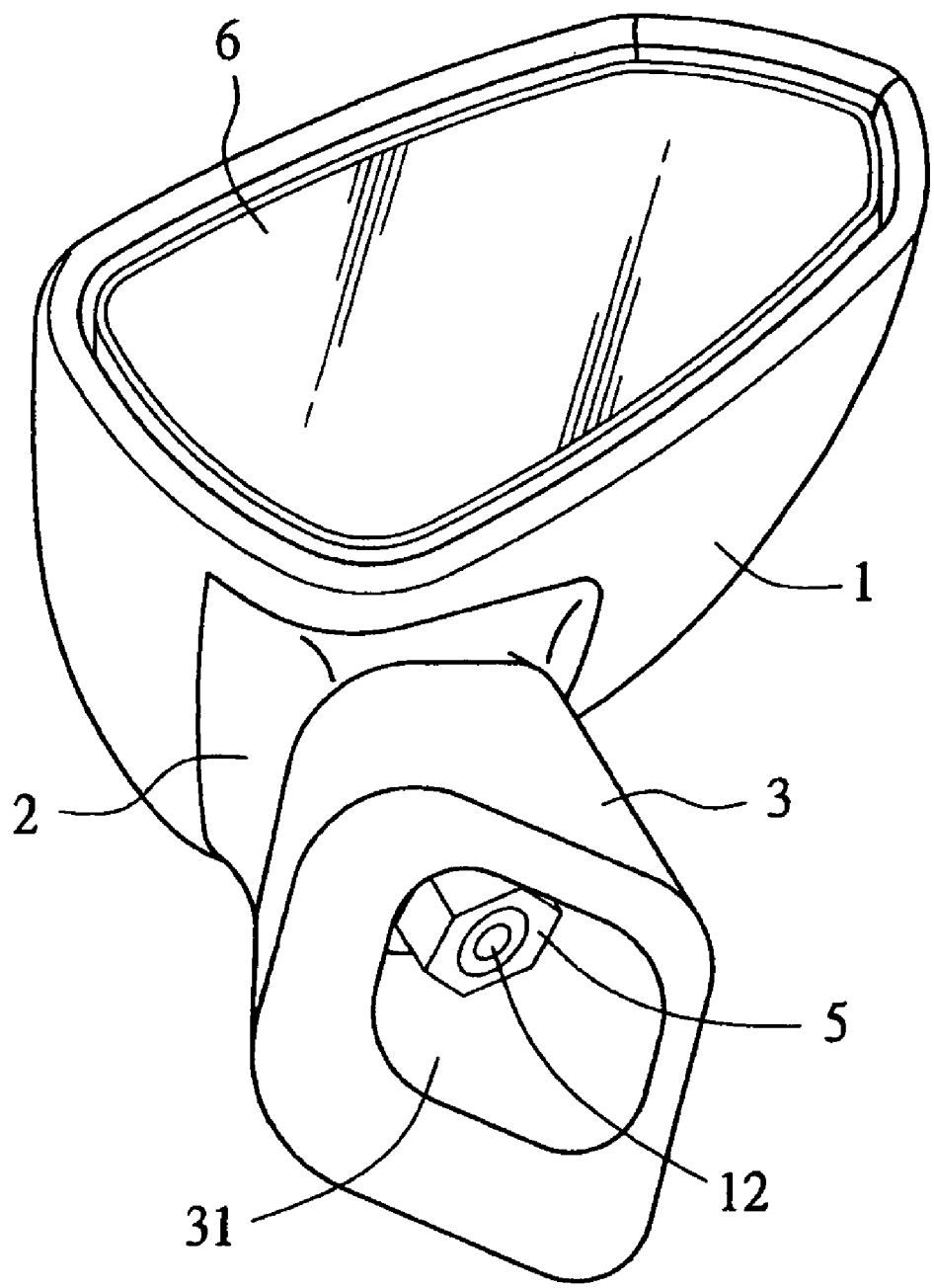
FIG. 1 is a perspective view of a first preferred embodiment of a door mirror of an automobile according to the invention.
Figure 2:
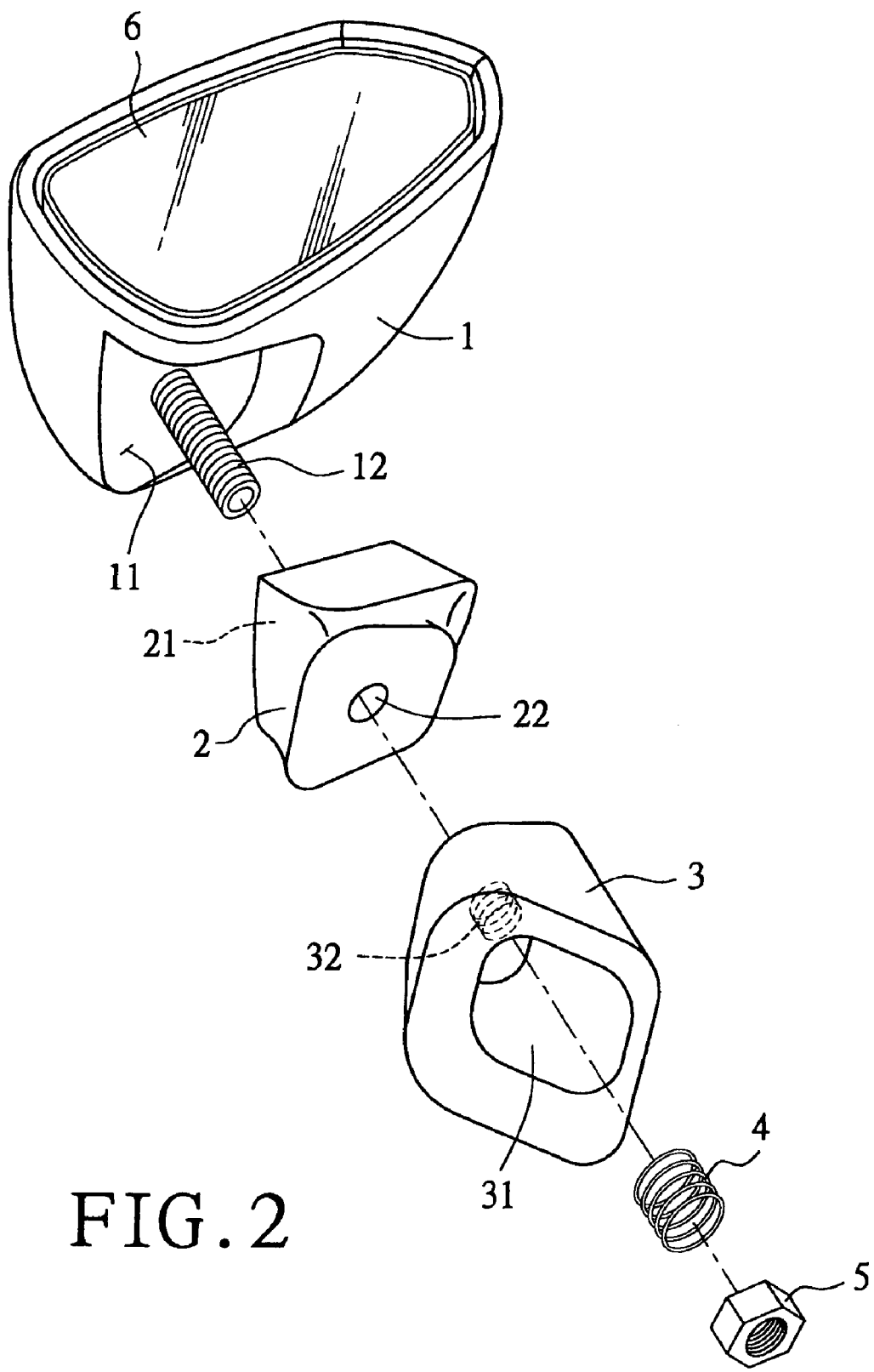
FIG. 2 is an exploded view of the door mirror shown in FIG. 1.
Figure 3:
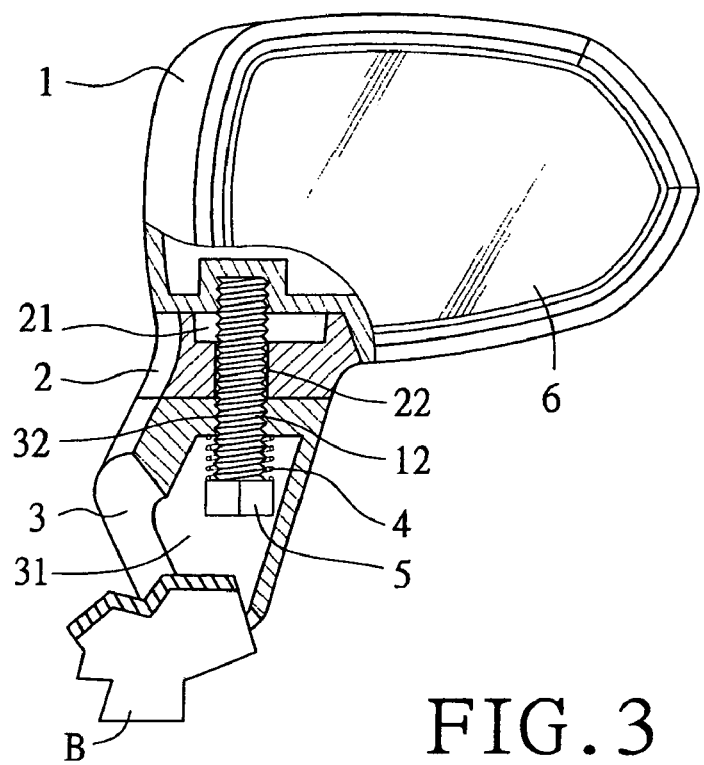
FIG. 3 is a rear view in part section of the door mirror shown in FIG. 1.

Referring to FIGS. 1 to 3, there is shown a door mirror of an automobile constructed in accordance with a first preferred embodiment of the invention comprising a frame 1, an attachment element 2, and a bracket 3. Each component will be described in detailed below.

The frame 1 is fitted with a lens 6 and comprises a well 11 facing the body B of the automobile and a threaded shank 12 extended from the well 11 toward the body B of the automobile. The attachment element 2 comprises a recess 21 facing the well 11 and a transverse channel 22 in communication with the recess 21 and the outside. The bracket 3 is mounted on the body of the automobile and comprises a threaded hole 32 facing the attachment element 2 and a cavity 31 in communication with the hole 32 and the outside. The shank 12 extends through the channel 22 and is threaded in the hole 32. A compression spring 4 is then put on the projected portion of the shank 12 in the cavity 31. Finally, a nut 5 is put on the shank 12 to compress the spring 4 by threading. This completes the assembly of the door mirror (see FIG. 3).

Figure 4:
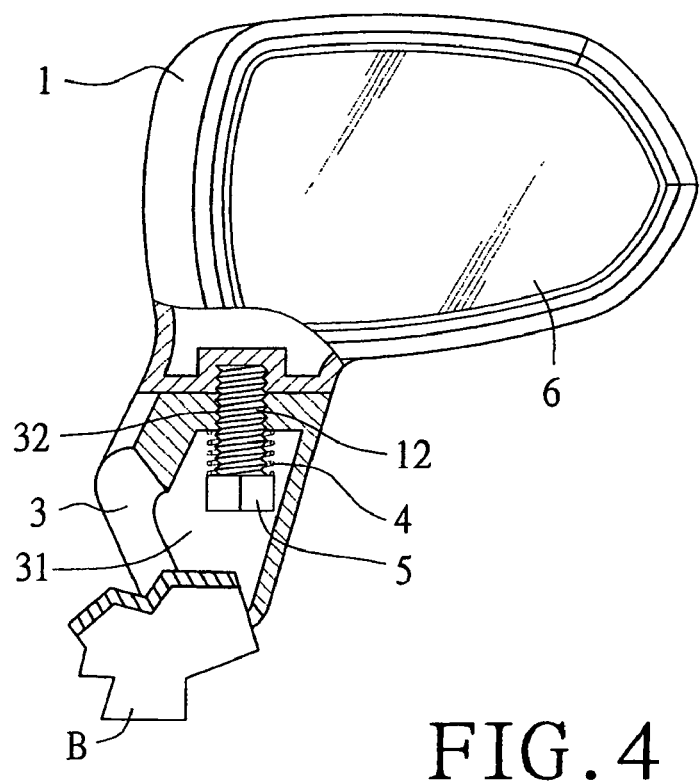
FIG. 4 is a view similar to FIG. 3 showing a second preferred embodiment of a door mirror according to the invention.

Referring to FIG. 4, a second preferred embodiment of a door mirror according to the invention is shown. It is a slight modification of the first preferred embodiment in which the attachment element 2 is removed such that the bracket 3 can be secured to the frame 1 directly by the shank 12, the spring 4, and the nut 5.

Figure 5:
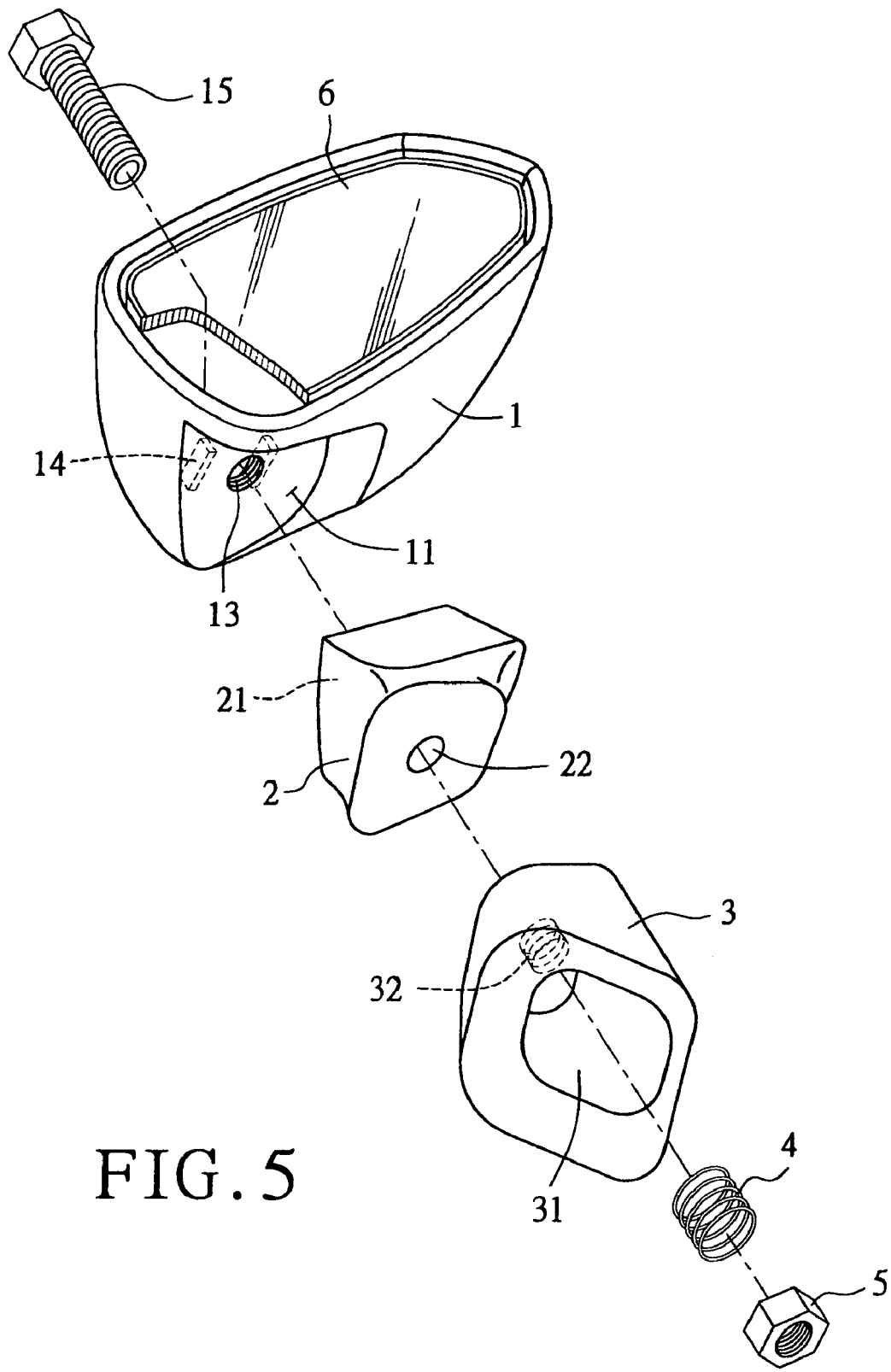
FIG. 5 is a perspective view of a third preferred embodiment of a door mirror of an automobile according to the invention.
Figure 6:
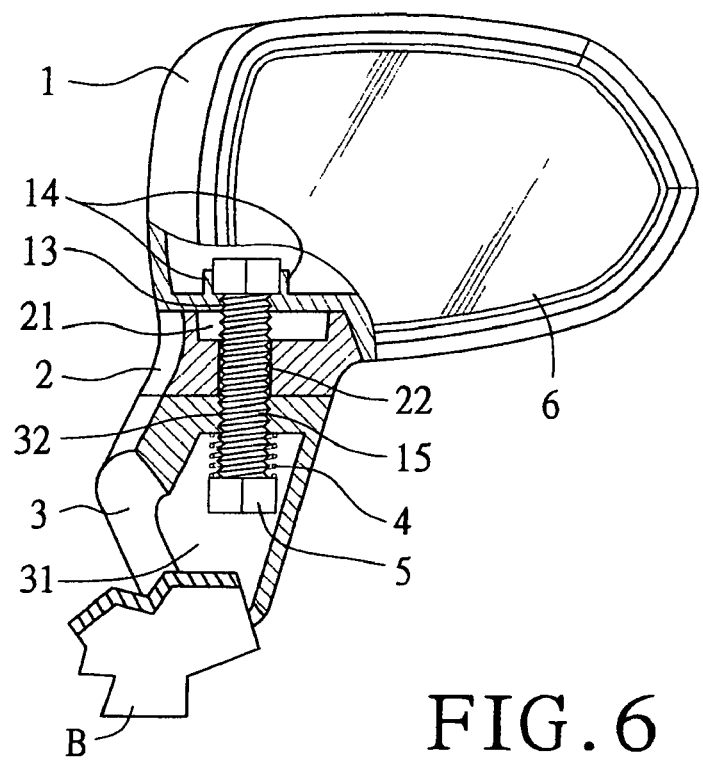
FIG. 6 is a rear view in part section of the door mirror shown in FIG. 5.

Referring to FIGS. 5 and 6, there is shown a third preferred embodiment of a door mirror according to the invention. It is also a slight modification of the first preferred embodiment in which the shank 12 is removed and a threaded hole 13 is formed in the well 11. Also, two opposite ribs 14 are extended inwardly from the inner end of the hole 13 for restraining the head of a bolt 15 extending through the hole 13 and the channel 22 and threaded in the hole 32. The compression spring 4 is then put on the projected portion of the bolt 15 in the cavity 31. Finally, the nut 5 is put on the bolt 15 to compress the spring 4 by threading. This completes the assembly of the door mirror.

Figure 7:
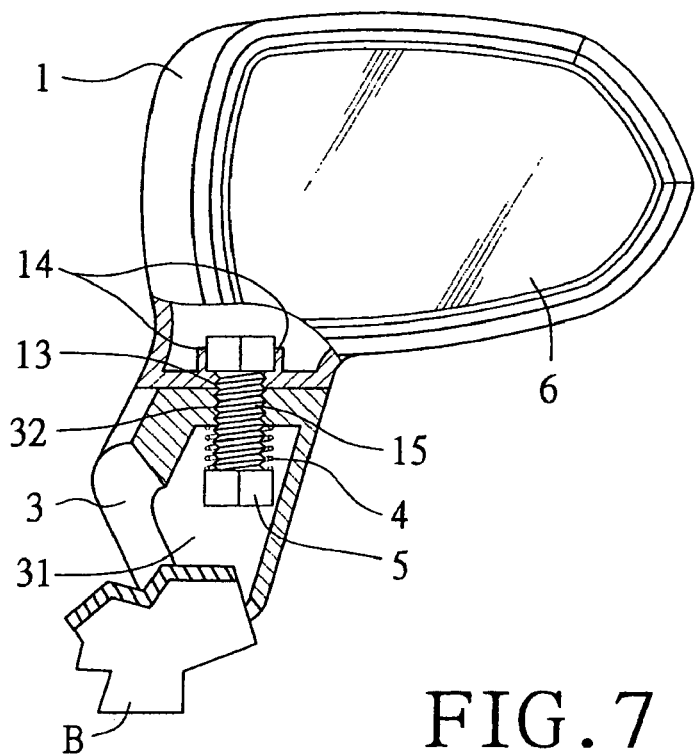
FIG. 7 is a view similar to FIG. 6 showing a fourth preferred embodiment of a door mirror according to the invention.
Figure 8:
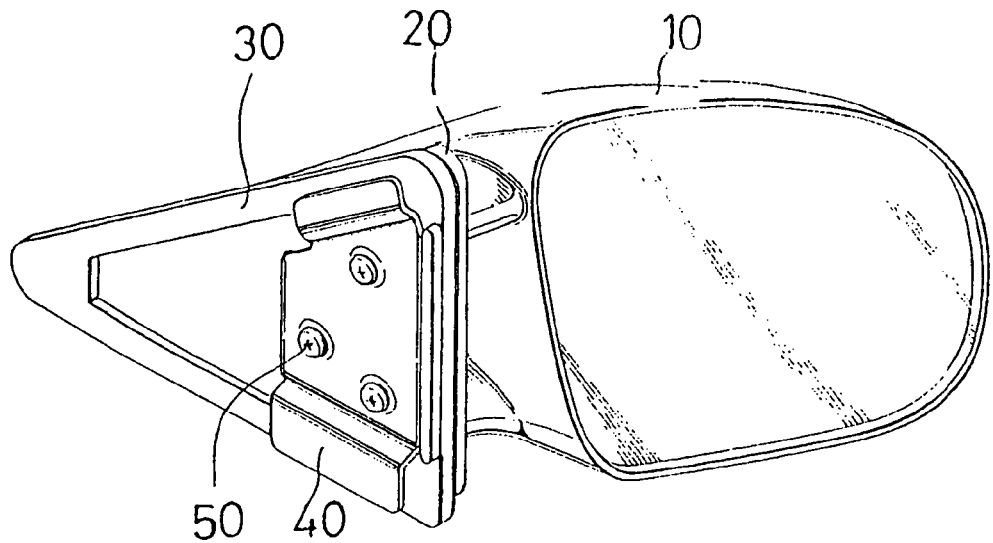
FIG. 8 is a perspective view of a conventional door mirror of an automobile.
Figure 9:
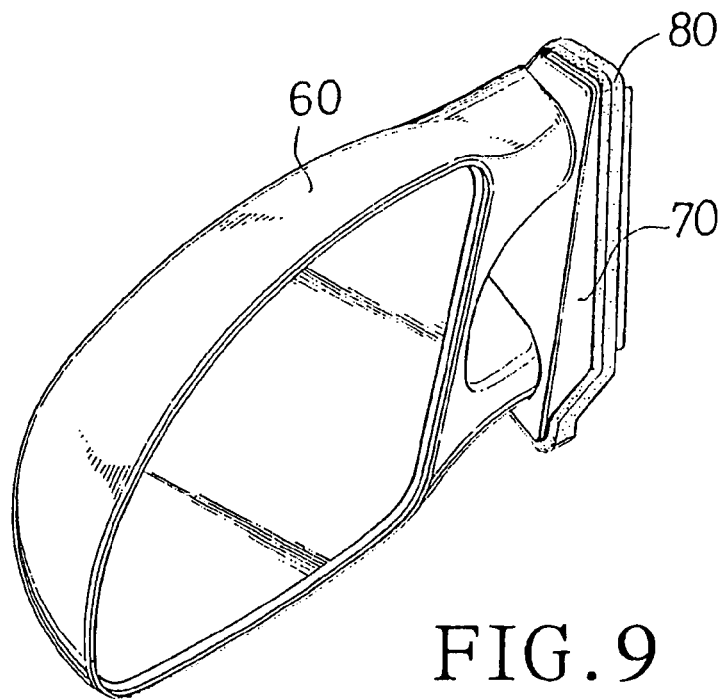
FIG. 9 is a perspective view of another conventional door mirror of an automobile.

Referring to FIG. 7, a fourth preferred embodiment of a door mirror according to the invention is shown. It is a slight modification of the third preferred embodiment in which the attachment element 2 is removed such that the bracket 3 can be secured to the frame 1 directly by the bolt 15, the spring 4, and the nut 5.

Advantageously, both the frame 1 and the attachment element 2 can be manufactured in mass production (i.e., low unit cost) since they are common to all types of automobiles produced by the same manufacturer or different manufacturers. Further, the bracket 3 can be produced in small scale for being adapted to mount in one of different automobile models or one of various automobiles produced by different manufacturers only. For example, only a replacement of the bracket 3 of a malfunctioned door mirror is sufficient if both the frame 1 and the attachment element 2 are still good for use. The invention thus can save the cost of replacing a malfunctioned door mirror.

While the invention herein disclosed has been described by use of specific embodiments, numerous modifications and variations could be made thereto by those skilled in the art without departing from the scope and spirit of the invention set forth in the claims.

What is claimed is:

1. A door mirror for mounting on a body of an automobile, comprising:
   a frame comprising a lens fitted therein, a well adapted to face the body of the automobile, and a threaded fastener extended from the well and adapted to extend toward the body of the automobile;
   an attachment element comprising a recess facing the well and a transverse channel in communication with the recess and outside;
   a bracket adapted to be mounted on the body of the automobile and comprising a threaded hole facing the attachment element and a cavity in communication with the threaded hole and the outside; and
   a nut;
   wherein the threaded fastener extends through the transverse channel and is threaded in the threaded hole of the bracket into the cavity to be secured by the nut.

2. The door mirror of claim 1, further comprising a compression spring put on a projected portion of the fastener in the cavity and compressed by the nut.

3. The door mirror of claim 1, wherein the fastener comprises a threaded bolt extending through the channel, threaded in the threaded hole and extending into the cavity, with the threaded bolt having a head engaging a wall of the well, and with the nut threaded on the bolt to fasten the fastener.

4. The door mirror of claim 3, further comprising a compression spring put on a projected portion of the bolt in the cavity and compressed by the nut.

5. A door mirror for mounting on a body of an automobile, comprising:
   a frame comprising a lens fitted therein, a well adapted to face the body of the automobile, and a threaded fastener extended from the well and adapted to extend toward the body of the automobile;
   a bracket adapted to be mounted on the body of the automobile and comprising a threaded hole facing the well and a cavity in communication with the threaded hole and the outside; and
   a nut;
   wherein the fastener is threaded in the threaded hole of the bracket and extends into the cavity to be secured by the nut.

6. The door mirror of claim 5, further comprising a compression spring put on a projected portion of the fastener in the cavity and compressed by the nut.

7. The door mirror of claim 5, wherein the fastener comprises a threaded bolt threaded in the threaded hole and extending into the cavity, with the threaded bolt having a head engaging a wall of the well, and with the nut threaded on the bolt to fasten the fastener.

8. The door mirror of claim 7, further comprising a compression spring put on a projected portion of the bolt in the cavity and compressed by the nut.

9. The door mirror of claim 8, wherein the well includes a hole and two ribs on opposite sides of the hole and extending inwardly opposite to the threaded fastener, with the bolt extending through the hole, with the head of the bolt located between the two ribs.

10. The door mirror of claim 7, wherein the well includes a hole and two ribs on opposite sides of the hole and extending inwardly opposite to the threaded fastener, with the bolt extending through the hole, with the head of the bolt located between the two ribs.

11. The door mirror of claim 4, wherein the well includes a hole and two ribs on opposite sides of the hole and extending inwardly opposite to the threaded fastener, with the bolt extending through the hole, with the head of the bolt located between the two ribs.

12. The door mirror of claim 3, wherein the well includes a hole and two ribs on opposite sides of the hole and extending inwardly opposite to the threaded fastener, with the bolt extending through the hole, with the head of the bolt located between the two ribs.

* * * * *